United States Patent [19]
Kato et al.

[11] 4,455,071
[45] Jun. 19, 1984

[54] LIGHT MEASURING INSTRUMENT FOR A SINGLE LENS REFLEX CAMERA

[75] Inventors: Masatake Kato, Tokyo; Tokuichi Tsunekawa, Kanagawa, both of Japan

[73] Assignee: Canon Kabushiki Kaisha, Tokyo, Japan

[21] Appl. No.: 339,701

[22] Filed: Jan. 15, 1982

[30] Foreign Application Priority Data

Jan. 22, 1981 [JP] Japan .................................. 56-7135

[51] Int. Cl.³ .............................................. G03B 7/08
[52] U.S. Cl. .................................................. 354/431
[58] Field of Search ........................................ 354/31

[56] References Cited

U.S. PATENT DOCUMENTS 4,289,389 9/1981 Kobori et al. ......................... 354/31
4,309,090 1/1982 Yamada ................................ 354/31

*Primary Examiner*—Michael L. Gellner
*Attorney, Agent, or Firm*—Toren, McGeady and Stanger

[57] ABSTRACT

A light measuring instrument for a single lens reflex camera, whose light measurement distribution can be changed easily, includes two light sensing elements with different light measuring ranges, whereby the desired light measuring distribution can be obtained by changing the outputs of the two light sensing elements.

1 Claim, 4 Drawing Figures

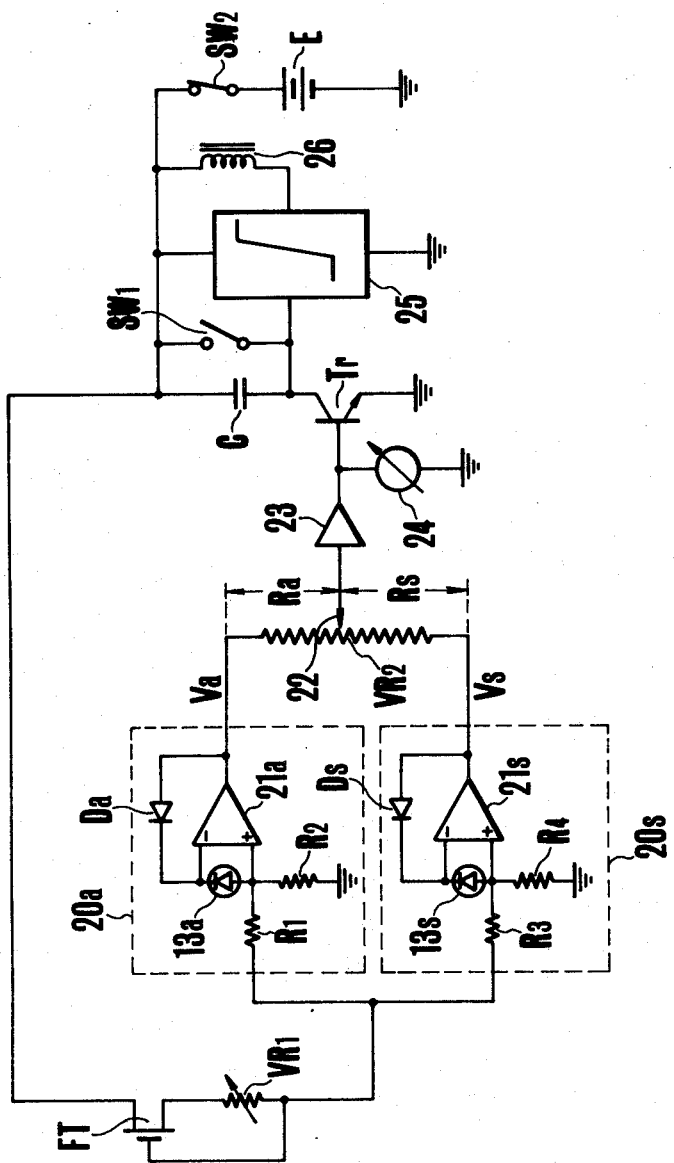
F I G. 3

LIGHT MEASURING INSTRUMENT FOR A SINGLE LENS REFLEX CAMERA

BACKGROUND OF THE INVENTION

1. Field of the Invention

The present invention relates to the so-called TTL direct light measuring system for a single lens reflex camera for measuring the light reflected upon the film plane and the leading shutter curtain, whereby the light measuring range can be changed over by an electrical means.

2. Description of the Prior Art

The TTL direct light measuring system for the single lens reflex camera for measuring the light reflected upon the film plane and the leading shutter curtain has many merits. The real time light measurement of the object image during the exposure is possible, automatic exposure photography is possible when the lens aperture is closed, and TTL-flash light photography is possible. However, it is rather difficult to change the light measuring range between the average light measurement and the partial light measurement.

A device for changing over the light measuring range is already known. One light sensing element is arranged at the side of the bottom of the camera body. In front of the light sensing element two different optic systems for changing over the average light measuring range and the partial light measuring range are arranged to change the light measuring range. For example, the Japanese patent application Laid-Open No. Sho 53-98821 discloses a system that is shown in FIG. 1. The amount of light passing the photographing lens 1 and the half permeable plane in the quick return mirror 2 and reading the leading shutter curtain 3 and the film plane 4 is measured by means of a light sensing element 5 via optics. However, the changeover between the average light measuring range and the partial light measuring range is carried out by replacing the optics 6 with optics 7 making it necessary to provide a means for mechanically operating the two optics 6 and 7 from outside the camera resulting in a larger operating member and making quick operation difficult.

SUMMARY OF THE INVENTION

It is an object of the present invention to provide a light measuring instrument for the single lens reflex camera free from the shortcomings of the conventional instrument. In front of the light sensing elements a plural number of the fixed optics having different light measuring ranges are provided. Movable operation members are eliminated by selecting the light measuring range by an electrical means making quick operation possible.

In order to achieve this object, the light measuring instrument, in accordance with the present invention, is so designed that the exposure amount is decided by sensing the light reflected upon the film plane and the leading shutter curtain during the exposure, including a plural number of light sensing elements secured at certain determined positions to measure the reflected light. A mechanism is secured in front of the light sensing elements so as to afford average light measuring efficiency and partial light measuring efficiency by means of optical means and a mechanism for changing over the average light measuring range and the partial light measuring range by means of an electrical means.

DETAILED DESCRIPTION OF THE DRAWINGS

FIG. 3 is a schematic view of the electrical circuit for processing signals in the camera of FIG. 2.

DETAILED DESCRIPTION OF PREFERRED EMBODIMENTS

Figure 1:
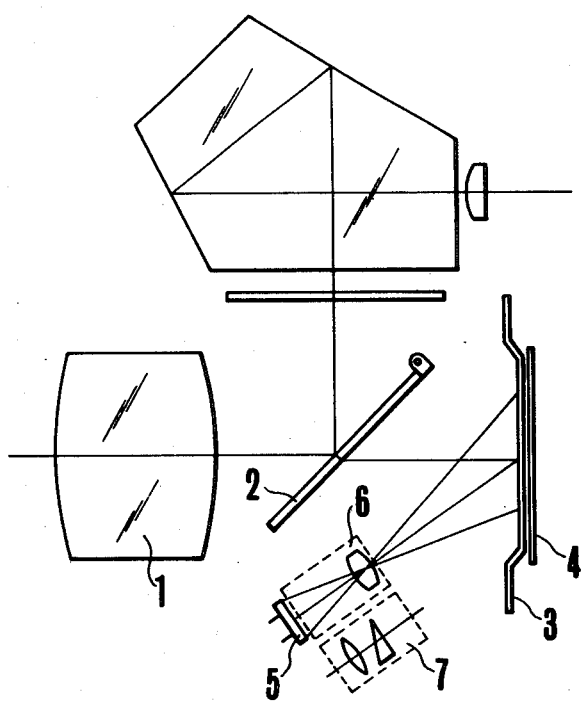
FIG. 1 is a schematic view of the optics of a conventional light measurement changeover mechanism.
Figure 2:
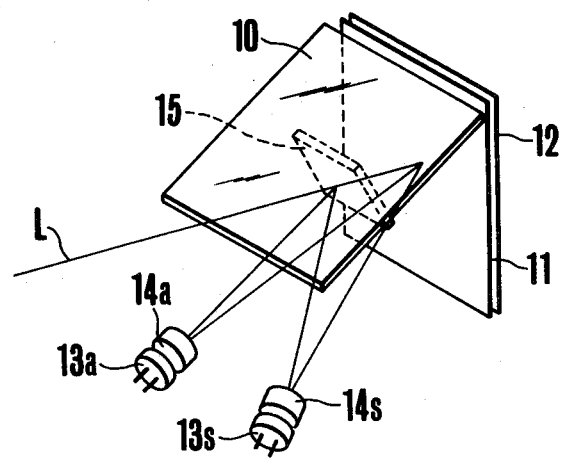
FIG. 2 is a schematic view of the optics of an embodiment of the light measuring instrument for a single lens reflex camera in accordance with the present invention.

FIG. 2 shows the optical system for changing over the light measurement range of the present invention. In the raised state of the quick return mirror 10 during exposure, the light is directly incident upon the focal plane shutter curtain 11 and the film plane 12. The shutter curtain 11 has reflection characteristics similar to those of the film. At the side of the bottom of the camera, two light sensing elements 13a and 13s are parallel and face the shutter curtain 11, while in front of the light sensing elements 13a and 13s, the lens systems 14a and 14s are stationary. The lens system 14a has, for example, a comparatively small focal length and includes at least one non-spherical lens. The lens system 14s has, for example, a comparatively large focal length and includes at least one non-spherical lens. Consequently, the light sensing element 13a measures the light reflected upon the comparatively large area of the leading shutter curtain 11 and the film plane 12a to enable average light measurement, while the light sensing element 13s measures light reflected from a small area to enable partial light measurement.

Furthermore, in the lowered state of the quick return mirror 10, before the exposure as shown in FIG. 2, a part of the light L passes the half permeable plane in the middle of the quick return mirror 10 and reaches the reflecting mirror 15 which is secured almost perpendicular to and behind the quick return mirror 10. The reflecting mirror 15 is disposed at an angle at which the light L, having passed the quick return mirror 10, is reflected toward the light sensing elements 13a and 13s before exposure, so that average and partial light measurement can be carried out. For this purpose, the light reflected from the leading shutter curtain 11 and the film plane 12 and measured by means of the light sensing elements 13a and 13s must be equal to the light reflected from the reflecting mirror 15 and measured by means of the light sensing elements 13a and 13s. Accordingly, this requires adjustment of the angle at which the reflected light is incident upon the light sensing elements 13a and 13s, the adjustment of the permeability of the quick return mirror 10, and the adjustment of the reflection factor of the reflecting mirror 15 or compensation by means of an electrical process. The light sensing element for measured light indication and that for TTL direct light measurement must not always be used in common, but the light sensing element for measured light indication can be conventionally arranged in the neighborhood of the eyepiece lens at the pentagonal prism.

FIG. 3 shows an embodiment of a specific electrical circuit, which selectively changes between the average light measurement range and the partial light measurement range when supplied with the outputs of the light sensing elements 13a and 13s, or varies the ratio of one output to the other to change the light measurement range. The average light measurement circuit and the partial light measurement circuit are respectively 20a and 20s. Outputs of the light sensing elements 13a and 13s are converted by means of the operational amplifiers 21a and 21s into the voltages Va and Vs as logarithmically compressed information of object brightness. Hereby, the light sensing elements 13a and 13s are the electro-voltaic photoelectric converting elements R1~R4 are the bias level setting resistors and Da and Ds are logarithmically compressing diodes for logarithmically compressing the outputs of the light sensing elements 13a and 13s. Furthermore, the set information reflecting the ASA sensitivity is delivered from the field effect transistor FT and film sensitivity setting resistor VR1 to the measuring circuits 20a and 20s with a constant current added to the voltages Va and Vs. The outputs Va and Vs of the measuring circuits 20a and 20s are applied to both ends of the resistor VR2 and delivered to the circuit in the next step via the slide terminal 22. The slide terminal 22 is operatively engaged with the light measuring range setting member on the camera body which is provided for optionally setting the light measuring range. The resistor VR2 between the slide terminal 22 and the average light measuring circuit 20a will be referred to as Ra and that between the slide terminal 22 and the partial light measuring circuit 20s will be referred to as Rs. Then, the voltage of the measured light information V at the slide terminal 22 is represented as follows:

$$V = Vs + (Va - Vs)[(Rs/Ra + Rs)] \tag{1}$$

For example, when $Ra = 0$, $V = Va$ from (1), which means the average light measurement. When $Rs = 0$, $V = Vs$, which means the partial light measurement. Furthermore, when the slide terminal 22 is set in the middle of the resistor, namely $Ra = Rs$, $$V = (Va + Vs)/2 \tag{2}$$

whereby the light measuring range is that with emphasis on the middle point between the average light measuring range and the partial light measuring range. When the slide terminal 22 is moved till $Ra > Rs$, this is the partial light measurement with emphasis on the middle point. When $Ra < Rs$, this is the average light measurement with emphasis on the middle point.

The output at the slide terminal 22 is indicated with the exposure indicating ampere meter 24 through the impedance converting buffer amplifier 23 and controls the shutter plane opening time by means of the actual time expanding circuit consisting of the transistor Tr, the condenser C, the count switch SW1, the Schmidt trigger circuit 25 and the shutter control magnet 26. In this circuit, the power source for the electrical circuit is E and the power source switch is SW2.

Figure 4:
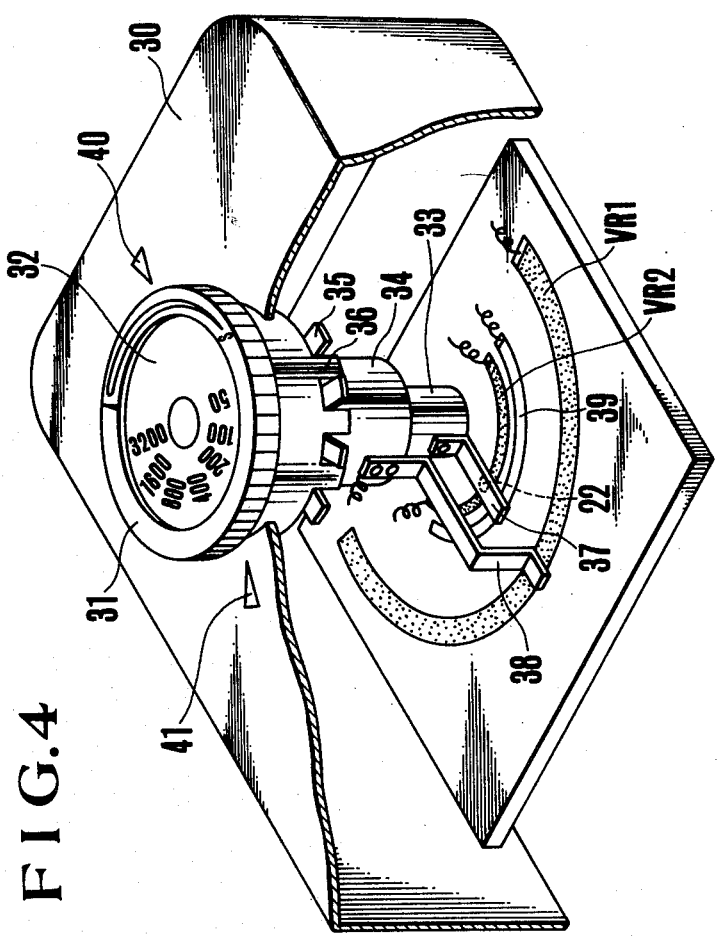
FIG. 4 shows a perspective view of the light measuring range setting mechanism in the camera of FIG. 2.

FIG. 4 shows the actual mechanism on the camera body to operate the variable resistors VR1 and VR2 of the electrical circuit, shown in FIG. 3. The ring-shaped light measuring range setting dial 31 is arranged coaxially with the film sensitivity setting dial 32 to rotate around the dial 32. Both these dials 31 and 32 are carried on the central axis 33. The light measuring range setting dial 31 when raised axially upward (as viewed) to an axial position which is higher than the sensitivity setting dial 32, engages with the central axis 33 to transmit rotary motion. The sensitivity setting dial 32, on which surface the film sensitivities are marked, cooperates with the cylindrical part 34 provided to rotate around the central axis 33. More specifically, the lower surface of the dial 32 includes a plurality of depending projections 36 dimensioned and configured so as to engage with a plurality of projections 35 extending radially from the cylindrical part 34. On the central axis 33, a radially extending brush 37 is secured, and the slide terminal 22 on the lower surface of brush 37 is in contact with the carbon slide resistor VR2 for input of the light measuring range. The resistor VR2 is coated in an arc in concentric relation with the central axis 33. Furthermore, the brush 38 which is radially secured on the cylindrical part 34 is in contact with the resistor VR1 for film sensitivity input. The resistor VR1 is coated coaxially with the resistor VR2. Furthermore, the conductive part 39 arranged coaxially around and with the resistor VR2 in contact with the brush 37 leads out the measured light information voltage V, while 40 and 41 are the light measuring range setting index and the film sensitivity setting index arranged on the camera body 30.

Consequently, when the dial 31 is rotated, the projections 35 are engaged with the projections 36 as shown in FIG. 4. The central axis 33 is not moved during the adjustment. Instead, the cylindrical shaft 34 is rotated to slide the brush 38 with reference to the resistor VR1 in order to input the film sensitivity information. When the light measuring range setting dial 31 is raised until the projections 35 disengage the projections 36 and is rotated, the film sensitivity inputting brush 38 remains secured while only the brush 37 secured on the central axis 33 is rotated moving the slide terminal 22 on the resistor VR2 and enabling the light measuring range to be optionally set.

Although the TTL direct light measuring system is adopted in the single lens reflex camera in accordance with the present invention, the changeover between the average light measuring range and the partial light measuring range can be realized quickly by means of a simple operation. Furthermore, in accordance with necessity, any light measuring range between the average light measuring range and the partial light measuring range can be selected.

What is claimed is:

1. A light measuring instrument for a single lens reflex camera, comprising:
    imaging optics for forming the object image on an image plane;
    a plurality of light sensing means at least having a first light sensing means for sensing the light from a first part of the object image and a second light sensing means for sensing the light from a second part overlapping and larger than the first part of the object image;
    a light measuring circuit supplied with outputs of the light sensing means;
    means for selectively inputting the output from the first and the second light sensing means to the light measuring circuit; and
    means for changing the ratio of the output of the first light sensing means to that of the second light sensing means.

* * * * *